June 12, 1956        E. H. KEIPER        2,750,123
HAMMER MILL FEED DEVICE, INCLUDING A ROTARY SPREADER AND THROWER
Filed Oct. 4, 1951        2 Sheets-Sheet 1
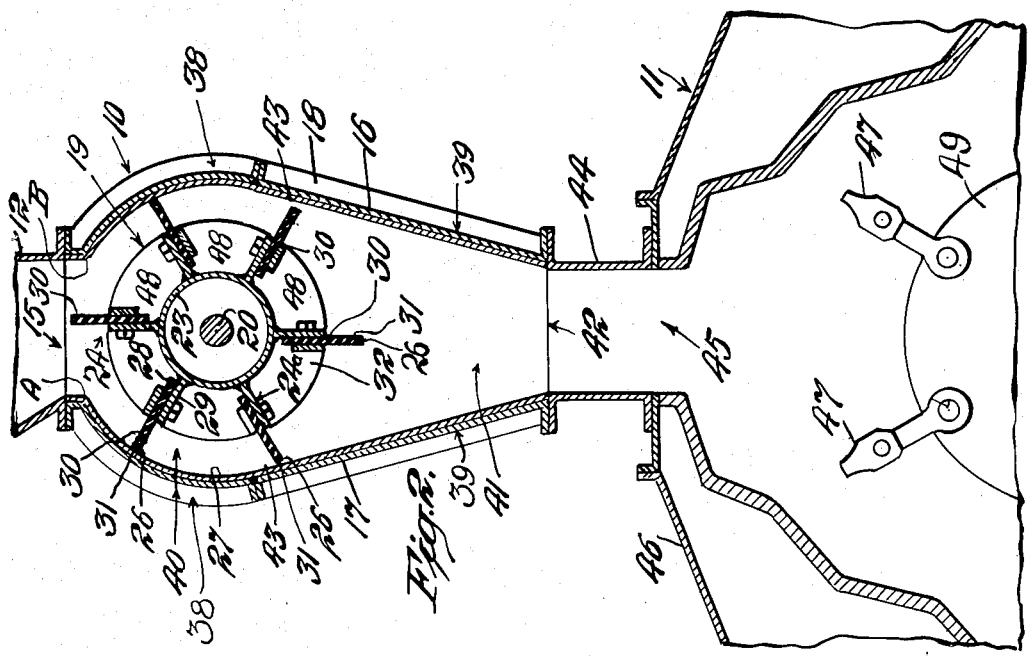
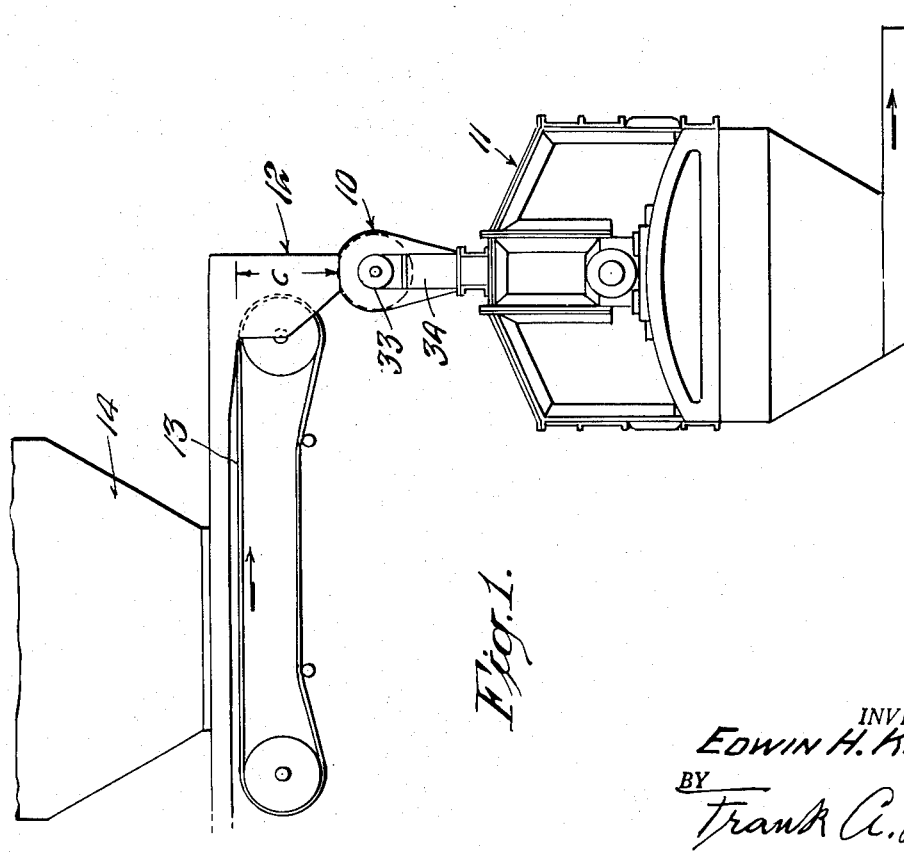
INVENTOR.
EDWIN H. KEIPER
BY
Frank A. Bower
ATTORNEY June 12, 1956  E. H. KEIPER  2,750,123
HAMMER MILL FEED DEVICE, INCLUDING A ROTARY SPREADER AND THROWER
Filed Oct. 4, 1951  2 Sheets-Sheet 2

INVENTOR.
EDWIN H. KEIPER

United States Patent Office 2,750,123
Patented June 12, 1956

2,750,123

HAMMER MILL FEED DEVICE, INCLUDING A ROTARY SPREADER AND THROWER

Edwin H. Keiper, Philadelphia, Pa., assignor, by mesne assignments, to Bath Iron Works Corporation, Bath, Maine, a corporation of Maine Application October 4, 1951, Serial No. 249,696

7 Claims. (Cl. 241—186)

This invention relates to the feeding of material to crushers and the like and particularly to the control and distribution of the material being handled.

The object of the invention is to feed the rotor of a hammermill with a continuous stream of material uniformly distributed along the rotor.

Further objects of the invention, particularly in the structure and the operation of the mechanism to provide an effective dust seal, will become more apparent from a consideration of the following description taken together with the accompanying drawings in which Fig. 1 is a front elevation of a crushing apparatus incorporating the rotary distributor of this invention together with a hammermill;

Fig. 2 is a radial section of the rotary distributor;

Figures 3, 4:
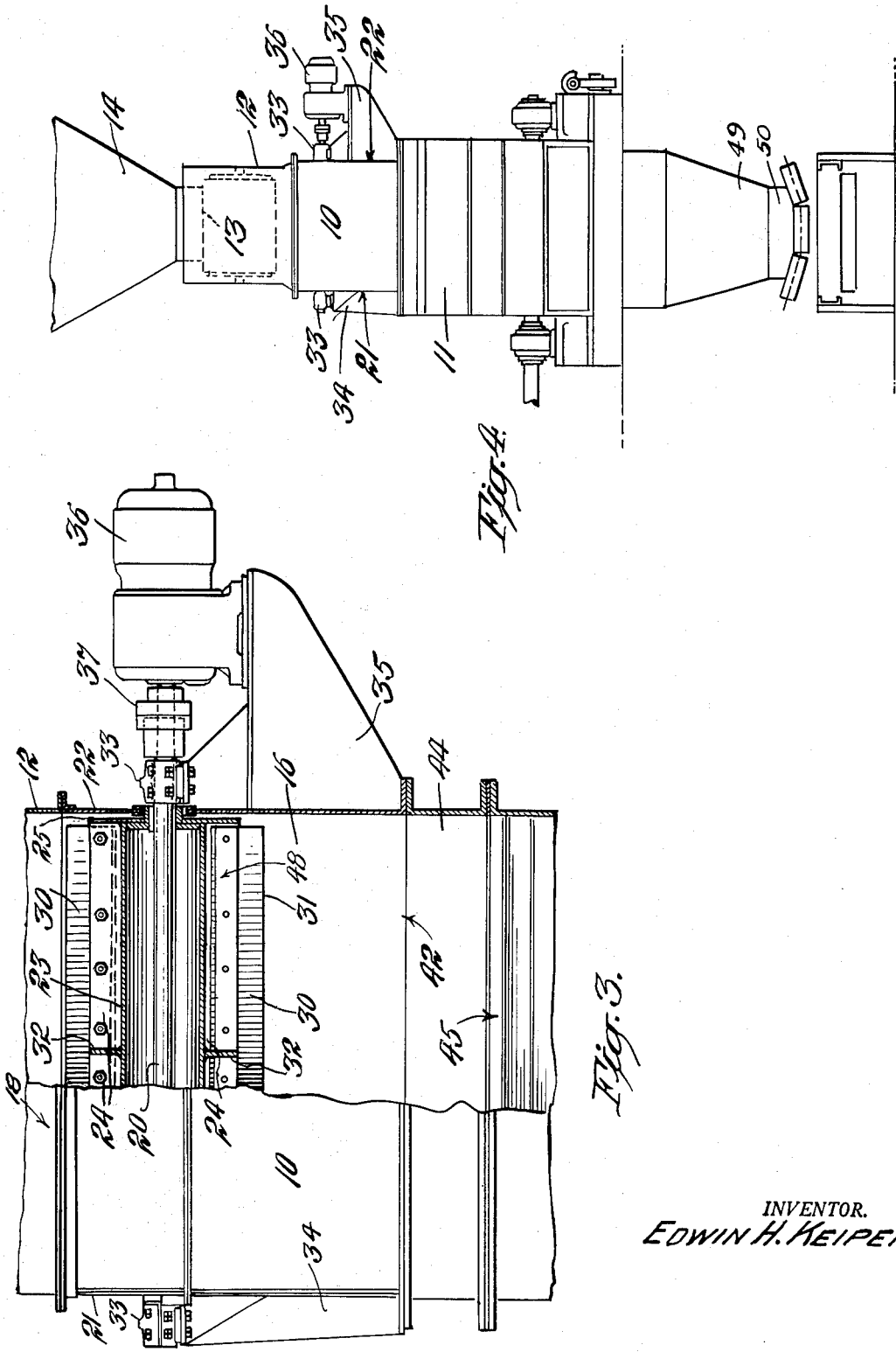
Fig. 3 is a side elevation of the distributor and the hammermill with the side cover partially broken away.
Fig. 4 is an end elevation of the apparatus of Fig. 1 with sections partly broken away.

In general, this invention in regularizing the flow of crushable material to a crusher maintains a high rate of feed of material to the crusher and at the same time evenly distributes the material to obtain a uniform crushing action and consequent regularly sized products. The material is delivered for distribution at a velocity determined by a free fall through a vertical drop under the acceleration of gravity. In the discharge from the distribution of the material, this velocity is preserved and preferably exceeded so that there is no net loss of the velocity in the distributing action but rather a gain. After distribution the velocity is further increased by another free fall into the hammermill.

This invention is employed in a breaking or crushing apparatus such as shown in Fig. 1 wherein a distributor 10 is positioned above a reversible hammermill 11 to which it delivers crushable material. The distributor 10 in turn receives crushable material through a feed passage 12 from belt 13. The crushable material is delivered to the belt 13 from a hopper 14. The material is uniformly distributed axially by the distributor 10 and delivered uniformly along the length of the hammermill rotor. The crushed material is dropped through the feed chute 49 onto another belt conveyor, receiving the material from underneath the feed chute 50.

As shown in Fig. 2, the distributor 10 is provided with a top aperture 15 for receiving the crushable material from the feed passage 12. The aperture 15 lies between the two walls 16 and 17 which form the sides of a casing 18 in which a rotary assembly 19 is enclosed. At the center of the rotary assembly 19 is an axial shaft 20. In Fig. 3 it is shown that the axial shaft 20 extends from one end plate 21 of the casing 18 to the other end plate 22 of the casing 18. The distributor 10 as shown in Fig. 2 is symmetrical about an upright plane which extends through the axial shaft 20. The walls 16 and 17 are symmetrical but diametric. Thus, they have the same contour but wall 16 curves to the right while wall 17 curves to the left in the radial section. The walls 16 and 17 both extend from end plate 21 to the other end plate 22 parallel to the axial shaft 20 which is transversely medial between the walls 16 and 17.

Mounted on the axial shaft 20 is a drum 23 which also extends for the full length of the casing 18 as shown in Fig. 3. The drum 23 carries six blades 24 which extend outwardly from the drum toward the casing 18 as shown in Fig. 2 and axially of the casing 18. The ends of the blades are not in contact with the end plates 21 and 22 leaving a small area of axial separation 25. Radially the blades 24 have an outer edge 26 which runs axially of the casing 18. This outer edge 26 of each blade is in brushing contact with the inner surface 27 of the walls 16 and 17. Each blade 24 has a pair of radial surfaces 28 and 29. As shown in Fig. 2, the rotary assembly is arranged to rotate in a clockwise direction. Thus, on each blade 24 in Fig. 2 the surface 28 is the leading or impelling surface while the surface 29 is the trailing surface. The blade 24 comprises a stiff inner portion 24a and an outer flexible lip 30. The inner portion 24a is made of steel and is rigidly attached to the drum 23 and the radial supporting member 32. The lip 30 is attached to the leading surface of the inner portion along the outer edge 26a. Each rubber lip 30 has a projection section 31 which extends into the radial space between the outer edge 26a of the blade and the inner surfaces 27. The lips 30 provide a seal on the rotary assembly between the blades portions 24a and wall surfaces 27.

The rotary assembly 19 includes stiffening member 32 attached in the arcs between the radial blades 24. This stiffening member 32 provides the assembly 19 in general and the blades portion 24a in particular with a circumferential strength. The axial shaft 20 turns in bearings 33 which are supported outside of the end plates 21 and 22 on their respective bases 34 and 35. The base 35 adjacent the end plate 22 at the right side of the distributor 10, as seen in Fig. 3 also supports the motor 36 which is connected to and drives the axial shaft 20 through a clutch 37. The motor 36 is suitably powered to drive the axial shaft 20 at various speeds.

The rotor assembly 19 thus driven through the axial shaft 20 by the motor 36 is positioned in the upper portion of the casing 18 immediately adjacent the aperture 15. The cross section of the casing 18 has an inverted pear shape. The casing 18 is given this shape by the curvature of the walls 16 and 17. Each of the walls 16 and 17 has a section 38 extending downward from the top aperture 15. The sections 38 are curved radially to conform to the radius of the rotary assembly 19. Straight sections 39 extend below sections 38. The straight sections are tangential to the curved sections 38. The curved sections 38 of the walls 16 and 17 form a partially cylindrical space 40 at the upper end of the casing 18. The tangential straight sections 39 of the walls 16 and 17 are inclined inwardly and toward each other at the lower end of the casing to provide a narrowing tapered passage 41 terminating in a discharge aperture 42. The passage 41 forms an entrance passage from the rotary distributor to the hammermill. The rotary assembly 19 is concentrically positioned in the space 40 and the lower portion of the assembly extends into the upper portion of the passage 41. The lips 30 on rotating with the assembly 19 sweep across the curved inner surfaces 27 of the sections 38 of the walls 16 and 17. These walls extend circumferentially around the rotary assembly from the aperture 15 to an imaginary line indicated at 43 on each of the walls 16 and 17. The lines 43 represent the point where the walls 16 and 17 cease to be radial and become tangential. These lines, therefore, are the dividing lines between the curved sections 38 and the straight sections 39. Since the walls 16 and 17 extend axially of the casing 18 from end plate 21 to end plate 22, the aperture 15, the space 40, the tapered passage 41 and the aperture 42 all extend axially to the casing 18 from one end plate to the other.

The hammermill 11 has a rotor 49 with hammers 47 and is centrally positioned below the distributor 10. The crushable material is fed from the distributor 10 through the opening 42, the duct 44 and the entrance opening 45 into the top center of the hammercircle. The duct 44 connects the opening 42 with the opening 45 in the top of the hammermill casing 46. The discharge aperture 42 and the duct 44 which extend the length of the casing 18 from end plate 21 to end plate 22 are preferably co-extensive with the length of the hammer array in the hammermill 11 as shown in Fig. 3. Thus, the crushable material is fed from the distributor 10 into the hammermill 11 throughout the length of the hammers 47 in the casing 46. The crushable material, however, is not fed to the distributor 10 throughout the axial length of the rotary assembly 19.

In the end view of Fig. 4 the belt 13 is shown to be shorter in width than the lengthwise distance between the end plate 21 and 22. The hopper 14 which feeds the crushable material to the belt 13 is in turn narrower than the belt 13. The crushable material which is narrowed down by the hopper 14 in its delivery to the belt 13 is uniformly spread out in the distributor 10 to deliver a broader and more even feed of the material to the hammermill 11.

In Fig. 2 the rotary assembly 19 is shown made up of six radial blades 24 on the drum 23. A bucket 48 is formed by each pair of adjoining blades and the section of drum surface lying between the blades. The rotary assembly 19 is thus made up of six buckets 48. These buckets successively receive the crushable material from the feed chute 12 through the aperture 15. The rotor assembly shown in Fig. 2 is rotatable in a clockwise direction. Each individual bucket starts to receive material when the leading blade of the bucket passes shoulder A at the left side of the aperture 15 and begins to traverse the aperture. This period of material reception for a given bucket 48 ends when the trailing or following blade of the particular bucket passes shoulder B at the right side of the aperture 15. In the time interval between these two instants the bucket 48 is receiving an influx of material. During the immediate subsequent period of rotation of the rotary assembly 19 the crushable material is retained within the bucket 48 until the leading blade passes the tangency line 43. The material is sealed in the bucket 48 by the lips 30 on the blades 24. In moving from a shoulder B at the aperture 15 to the line 43 the lip 30 moves through an arc conforming to the curvature of the inner wall surface 27. The congruence of the path of the lip 30 and the arc shape of the surface 27 together with the proximity of the outer edge of the lips to the surface 27 provides a seal of the bucket 48 which retains the material within the bucket 48 until the line tangency 43 is passed by the leading blade of the bucket 48.

In operation the distributor of this invention receives a relatively narrow and irregular flow of crushable material from the belt 13 and transforms it into a widened ribbon of uniformly distributed material fed at a constant rate.

The crushable material is fed by this invention by gravity by a free and unobstructed fall through the chute 12. The chute or passage 12 does not fill up with the material to be crushed but is always clear letting material freely fall into the distributor. Its introduction into the distributor, therefore, is subject to the acceleration of gravity with the result that the speed of each particle of crushable material at the time of reception into the distributor can be determined by the length or height C of the free fall that the particle experiences before reaching one of the buckets. Thus, by the selection of the height of the vertical free fall the velocity of fall of the material can be controlled.

The material is fed radially into the distributor. The radial blades of the distributor through a part of their rotary motion travel in the same direction as the free falling gravity fed material. The material thus fed into the distributor while interrupted in its travel is, according to this invention, reestablished in its motion toward the crushing device at a rate imparted to the material by the distributor. The material thus fed into the distributor is interrupted in its travel but is quickly reestablished in its motion toward the crushing device at a rate imparted to the material by the distributor. This reestablishment of the motion of the material after the temporary interruption maintains a rapid flow of the material through the distributor and toward the crusher. According to this invention the reestablished velocity of the material as it leaves the rotary is in the range of one-half to three-fourths of the average velocity of the particles of material falling freely from rest through a vertical distance equivalent to the diameter of the distributor. Stated otherwise the average velocity of the particles of material upon leaving the distribution is one-half to three-fourths the average velocity of equivalent material which has fallen under gravitational attraction from a resting position through a distance equal to the diameter of the distributor. In the embodiment described herein these rates of motion are preferably in a range of from 5 to 7.5 feet per minute and the speed of rotation of the distributor is preferably in the range of from 60 to 90 R. P. M. It will be understood, however, that with the longer free fall of material the rates of motion of the material and rate of rotation of the distributor may be in a larger range.

It is a feature of this invention that when passing the crushable material through the distributor the material is mixed with itself to even out its density. This mixing is obtained in the buckets of the rotary assembly. Some of the factors producing this mixing are the tumbling of the material in the buckets as the rotary assembly turns and the impact of the rotating blades on the material. Another factor allowing this tumbling and impact to take effect is the function of the machine is only partially filling each bucket. Since the bucket is not filled the material has space to move with relation to itself. As the greatest dimension of the bucket is its axial length, the greatest direction of relative movement of the material in its internal redistribution is in an axial direction. This is referred to as axial spread. By means of this axial spread the crushable material is evened out across the machine in the width dimension shown in Fig. 4. During this redistribution operation the crushable material is retained within the bucket by sealing the open side of the bucket with the radially curved section of the housing wall. Thus the bucket is sealed by the housing wall during an appreciable part of the rotation of the rotary assembly and only partially filled with crushable material. The bucket produces mixing and an axial spread of the material.

The structure of this invention provides three variables by which the amount of fill in each bucket can be controlled. These are the size of the individual buckets, the rate of rotation of the rotary assembly and the height of the drop of the material. The individual buckets formed between the radial blades each receive a certain amount or increment of crushable material upon each revolution of the rotary assembly at a given speed of rotation. This amount is determined by the spacing between blades and the height of the fall of the crushable material before it is collected in the bucket. The greater the distance of drop, the greater will be the amount of crushable material collected in a bucket of given size at a given rate of rotation.

In the operation of the device according to this invention it is intended that the rate of rotation of the rotary assembly and height of drop of the crushable material be so selected that the buckets of the distributor be left incompletely filled. The effect of the carrying of the crushable material in a less than full bucket is to allow motion between the pieces of crushable material. This motion will bring about the mixing and spreading of the crushable material in the buckets.

The rotation of a bucket partially filled with crushable material on the rotary assembly causes mixing of the crushable material in at least two ways. First, by in effect turning the bucket upside down, the material in the bucket is also inverted. Second, when the crushable material enters the distributor its rate of travel is altered either en masse or individually. In a distributor of the relative dimensions described herein and shown in the drawings a preferred rate of rotation of the rotary assembly is 70 R. P. M. At this speed in the embodiment the particles falling into distributors are arrested only long enough to permit axial spread while maintaining a minimum rate and volume of flow of material through the distributor and into the crushing device.

The relationship of the diameter of the rotary distributor and the speed of rotation is important to have the proper peripheral speed. In the embodiment described the rotary distributor has a diameter of approximately two feet. With the minimum speed of sixty revolutions per minute the periphery will have the desired minimum velocity of approximately 700 feet per minute. The rotary distributor is a high speed impeller forcing the material outwardly off of the ends of the blade. With this velocity the material in the bucket 48 is forced by the following blade against the surface 27. The surface 27 holds the material between the blades as the bucket 48 passes the line 43 the material starts to leave the bucket and enter the passage 41 along the tangential section 39. The bucket continues to empty out with the material thrown by the blade into the passage 41. By the time the blade has reached a center position and has emptied the succeeding following blade is emptying the succeeding bath of material into the passage 41. The tangency point of section 38 and 39 is set to provide a continuous stream of material into the hammermill. In this embodiment it is below the center of the rotary distributor a distance equal to approximately one-eighth of the diameter of the rotary distributor.

In this embodiment the drum 23 has a radius of approximately five and one-half inches and the blades 24 approximately seven and one-half inches long. The inner portions 24a a radial length of approximately four inches which leaves space of approximately three and one-half inches between the outer edges 26a and the surfaces 27. The rubber lips 30 are securely attached to the inner portion 24a and extend outwardly to engage the surface 27. The rubber lip 30 has a flexible unsupported portion of approximately three and one-half inches in the radial dimension and approximately three-eighths of an inch thick. This forms a space between the edges 26a and the surfaces 27 that accommodates extraneous articles such as pieces of tramp iron, large stones and similar material. The lip 30 flexes when any extraneous material enters the space between the edge 26a and surface 27. The lip may resiliently hold the piece against the wall or flex back and drop it into the succeeding bucket.

The rotary distributor receives the narrow stream of material from the conveyor 13 at a volume flow at or near the optimum crushing capacity of the hammermill and discharges it at the same rate of flow. The material passes through the distributor to the hammermill without accumulating in the space above the distributor. The stream of material dropping from the conveyor is shorter axially than the hammer rotor and further contracts axially as it falls. The distributor uniformly spreads the material axially along the length of the rotor. The axial spread of the material to the hammermill is independent of the height of the conveyor 13. In this way the rotary distributor of this invention forms a dust seal. Thus it may be seen that the advantages of this invention include the regularizing of the density and rate of feeding of material to a gravity fed crushing device. At the same time the volume of material fed to the crushing device is increased. A further advantage obtained by this device is the control attained over the rate and volume of feed of the crushable material to the crushing device.

The embodiment of this invention described herein may be modified by varying the rate of rotation of the rotary distributor and the rate of the delivery of the crushable material into the rotary distributor. In these modifications the spirit of this invention is preserved by matching the rate of rotation of the rotary distributor to the speed of the gravity fed crushable material so that the rate of movement of the material on leaving the rotary distributor is at least of the same order as on its reception.

Other modifications to the above described embodiment may also be made without departure from the spirit of this invention. For example the number of buckets in a rotary distributor may be increased or decreased, the size and proportion of the radial blades may be changed and the material may be fed to various types of crushers. Likewise it is not necessary that the material move free of any surface in its delivery to the distributor. Any means of the delivery of the material to the distributor which imparts the desired rate of motion to the material is satisfactory. This invention is, therefore, limited only by the scope of the appended claims.

I claim:

1. In combination with a hammermill having a rotor with hammers vertically fed at top center of the hammercircle through a feed opening, a casing with an entrance opening in the top and symmetrical walls extending downward from opposite sides of said entrance opening, said walls having curved portions adjacent said opening and straight portions extending tangentially downward from said curved portions to the feed opening, a rotary distributor positioned between said curved portions and below said entrance opening receiving freely falling material through said entrance opening, said distributor having a central portion and at least three uniformly positioned rigid blades extending outwardly from said central portion with outer rubber tip portions forming resilient tips of approximately one-fourth the radius of the rotor extending to the curved walls and stiffening under the forces of rotation, said central portion and blades receiving said freely falling material at a predetermined velocity spreading it axially by interrupting the free fall and circumferentially carrying the materal against the following blade including the stiffened tip portions, said tangential portions forming a passage to receive the material from the rotor distributor as a continuous stream flowing at a higher velocity than the predetermined velocity and increase the speed of the material under the force of gravity into the hammermill through the feed opening.

2. The combination of a center feed hammermill having a rotor with hammers vertically fed at top center through a feed opening substantially narrower than the diameter of the hammercircle and a feed distributor located above said rotor hammers and delivering uniformly axially distributed material to the rotor hammers, means for delivering the free falling material at a predetermined velocity to said distributor, said distributor comprising a casing symmetrical about a plane through the center of rotation of said hammers and an impeller adapted to rotate at a rate having a peripheral speed of at least 700 feet per minute in said casing, said casing having an entrance opening above said impeller and a passage between said impeller and said feed opening, said impeller having blades extending generally radially a substantial portion of the distance outwardly to a diameter greater than the feed opening, impelling surfaces covering a substantially outwardly extending area on the side of said blades in the direction of rotation receiving axially bunched material passing through said entrance opening at a predetermined velocity and impelling it outwardly on the blades and downwardly in a continuous stream of uniformly axially spread material into said centered passage at a velocity higher than said predetermined velocity, said passage passing said material at increasing velocity under gravity substantially radially towards said hammers.

3. A material feed conditioner for a center feed hammermill centrally positioned above a rotor with hammers comprising an impeller of greater diameter than the width of said feed opening and adapted to rotate at a rate providing a peripheral speed of at least 700 feet per minute, a casing with symmetrical walls on opposite sides of the vertical plane through the center of said hammermill, said sides being formed with curved walls and tangential walls extending downward from the curved walls to a feed opening at the hammermill, a velocity feed passage above said casing supplying material at a rate freely passing and dropping it into the impeller at a predetermined velocity, said impeller having blades extending outwardly to the walls, and having impelling surfaces on the side of the blades facing in the direction of rotation forcing the material outwardly against the curved peripheral wall and along the impelling surfaces to uniformly spread the material axially and throw the material downwardly as a substantially continuous stream between said tangential walls, and said tangential walls forming a passage passing said stream at increasing velocity into said hammermill through said feed opening.

4. A method of continuously feeding material to a hammermill type crusher having rotor hammers comprising dropping substantially vertical a freely falling stream of axially bunched material directly into the top center of an impeller having blades, dividing the stream falling between the blades into freely distributable increments, carrying each increment on a forward surface of a blade at a high speed and spreading each increment axially along said blades during rotation of each increment from an upper position to a lower position, projecting successive uniformly distributed increments radially outwardly along a blade and downwardly to form a continuous stream of material, and increasing the velocity after leaving the impeller and before entering between the rotor hammers.

5. A method of continuously feeding material to a hammermill type crusher having rotor hammers comprising dropping substantially vertical at a predetermined velocity a freely falling stream of axially bunched material directly into the top center of an impeller having blades, dividing the stream into freely distributable increments carrying each increment on a forward surface of a blade at a high speed and spreading each increment axially along said blades during rotation of each increment from an upper position to a lower position, projecting successive uniformly distributed increments downwardly at a velocity higher than the predetermined velocity to form a continuous stream of material, and increasing the velocity at least two fold after leaving the impeller and before entering between the rotor hammers.

6. A feed for a hammermill type crusher having a rotor with successive sets of hammers and a centrally positioned feed opening comprising a free fall velocity feed passage for supplying continuously free flowing material, a casing having opposing walls curved symmetrically downward on both sides from the ends of said feed passage and straight walls extending downward from said casing walls to form an entrance passage a high speed spreader rotor within said casing positioned between said curved walls directly below the end of said feed passage to receive said continuously flowing material at a predetermined entering velocity and deliver the material to said receiving passage, said spreader having a central portion with a diameter approximately equal to the width of said opening and having blades extending outwardly therefrom to block the free vertical fall of the material and carry it peripherally and distribute it axially of the rotor, means for driving said rotor at a high speed to throw the material downwardly towards the hammermill through said passage in a substantially continuous stream and uniformly along the full axial length of the hammers at a velocity of the order of the entering velocity and projecting the material into the path of the hammers at a high penetration velocity.

7. A feed for a hammermill type crusher having a rotor with successive sets of hammers and a centrally positioned feed opening comprising a free fall velocity feed passage for supplying continuously free flowing material, a casing having opposing curved walls on both sides from the ends of said feed passage and walls extending downward from said casing walls to form an entrance passage a high speed spreader rotor having generally radially extending blades within said casing positioned between said curved walls directly below the end of said feed passage to block the free vertical fall of said continuously flowing material entering said casing at a predetermined velocity, means for driving said rotor at a high speed to force the material against the trailing blade and distribute the material axially and carry it peripherally to throw the material downwardly towards the hammermill through said feed passage in a substantially continuous stream and uniformly along the axial length of the hammers at a velocity of the order of the entering velocity and projecting the material into the path of the hammers at a high penetration velocity.

References Cited in the file of this patent

UNITED STATES PATENTS

| Number | Name | Date |
|---|---|---|
| 1,407,330 | Hiller | Feb. 21, 1922 |
| 1,410,636 | Williams | Mar. 28, 1922 |
| 1,648,747 | Stoner | Nov. 8, 1927 |
| 2,287,799 | Hartshorn | June 30, 1942 |
| 2,364,101 | Schurman | Dec. 5, 1944 |
| 2,367,179 | Arnold | Jan. 15, 1945 |
| 2,475,381 | Erickson | July 5, 1949 |
| 2,505,674 | Knight | Apr. 25, 1950 |
| 2,657,864 | Woock | Nov. 3, 1953 |

FOREIGN PATENTS

| Number | Country | Date |
|---|---|---|
| 51,854 | Denmark | July 6, 1936 |
| 84,699 | Germany | Jan. 3, 1896 |